Nov. 15, 1966  H. SCHMIDT ET AL  3,285,417
FILTER SLUICING METHOD AND APPARATUS
Filed Jan. 16, 1964  4 Sheets-Sheet 2
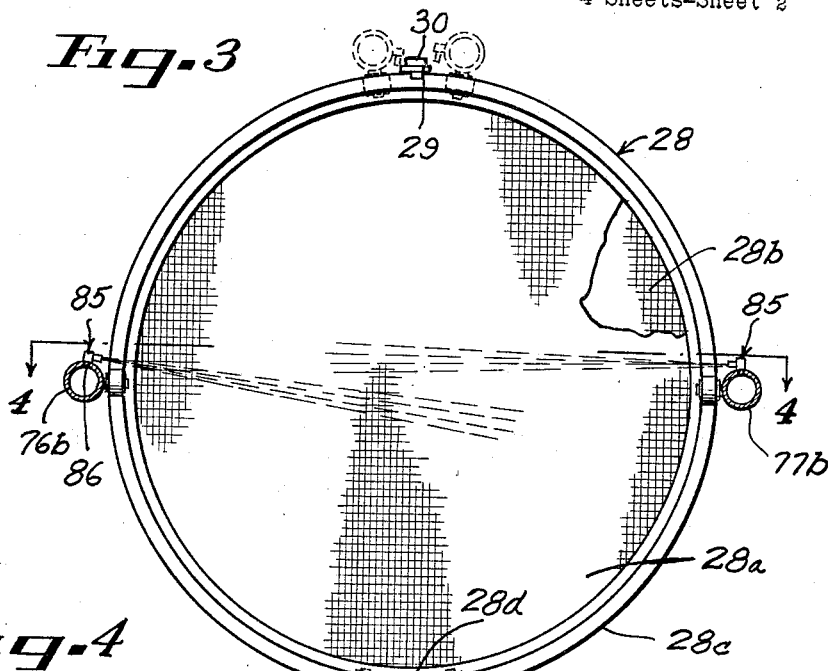
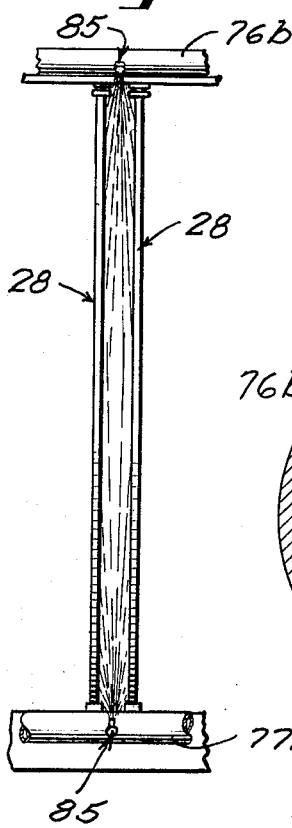
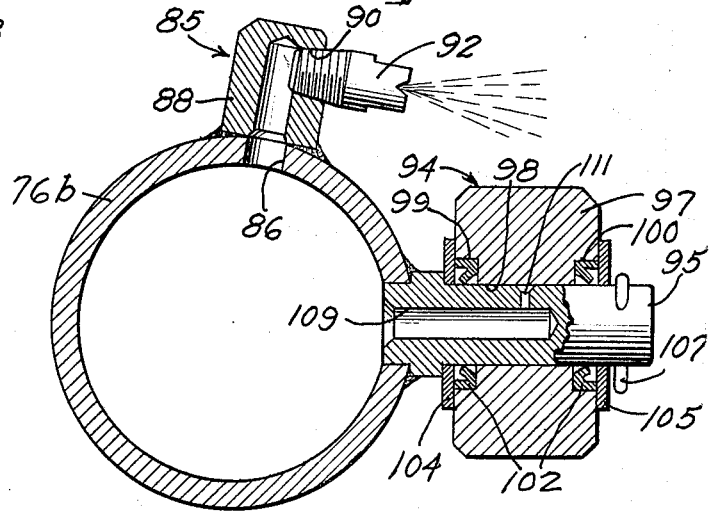
INVENTORS
Henry Schmidt, Jr.
BY James F. Zievers
Fidler, Bradley, Patnaude & Petherbridge
ATTORNEYS

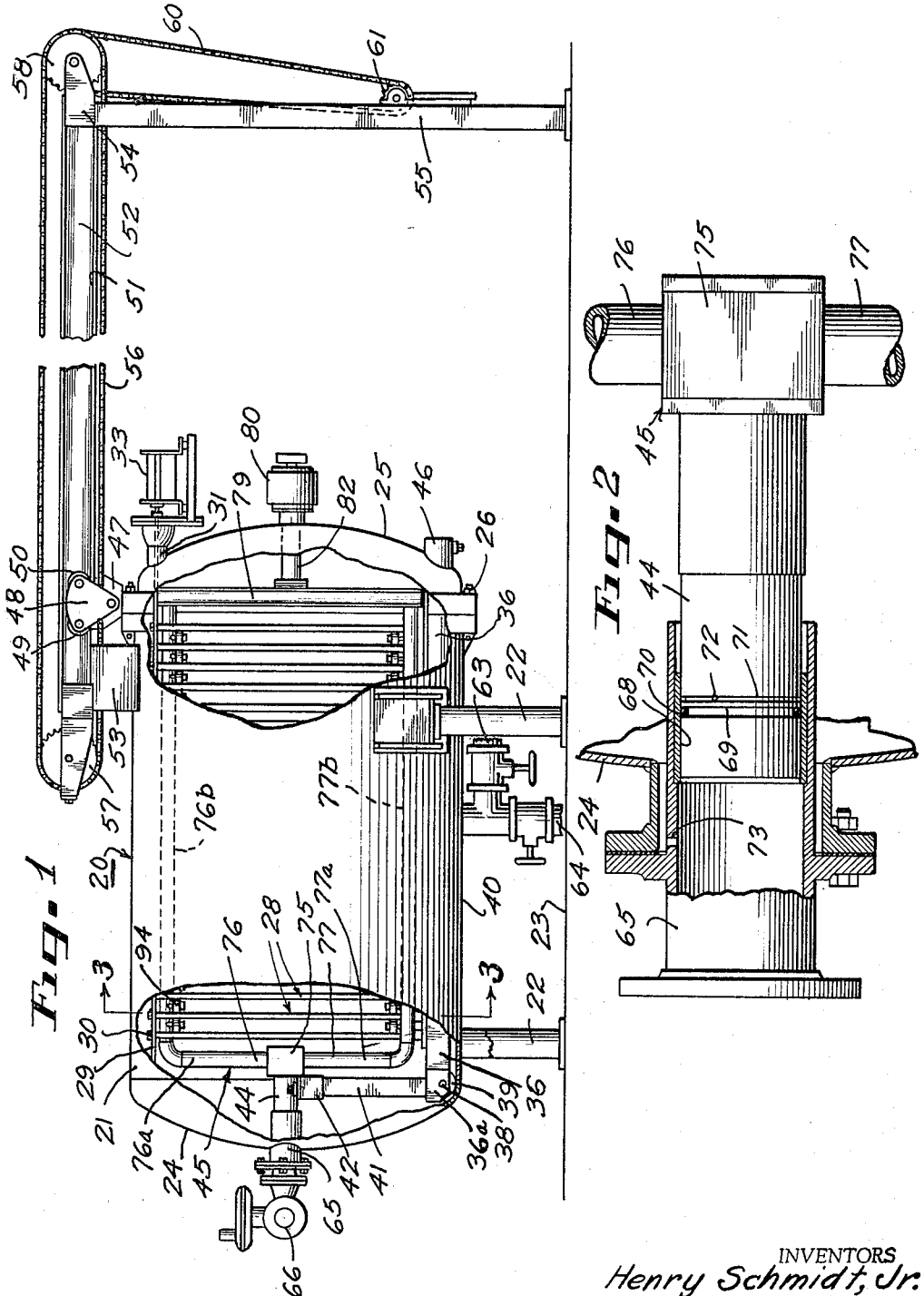

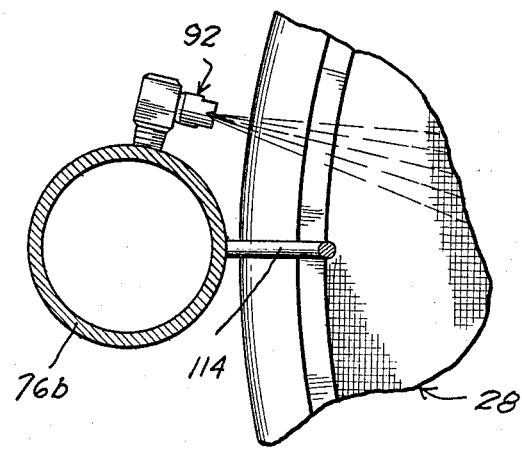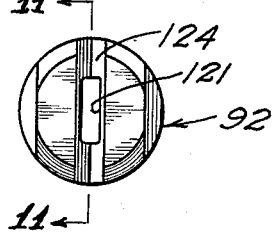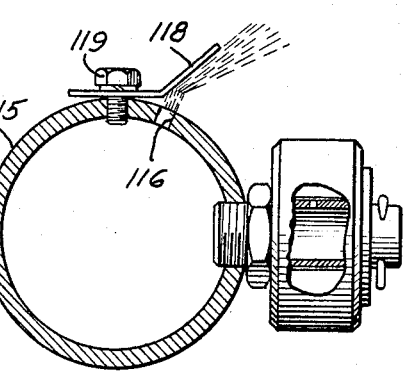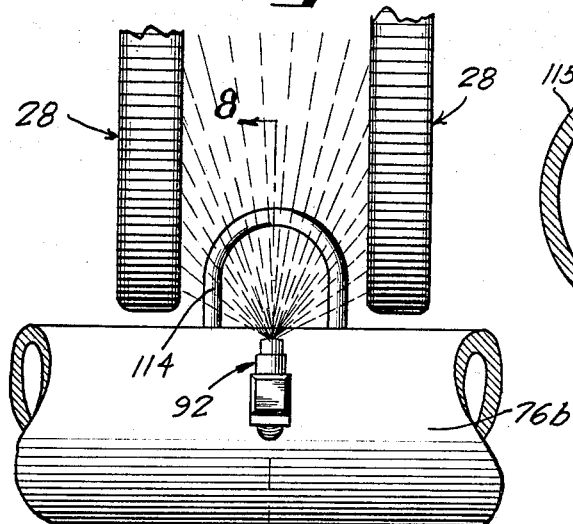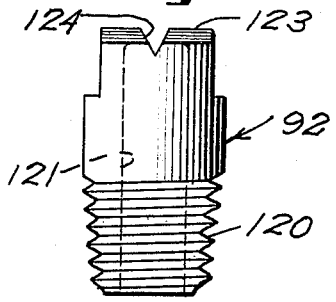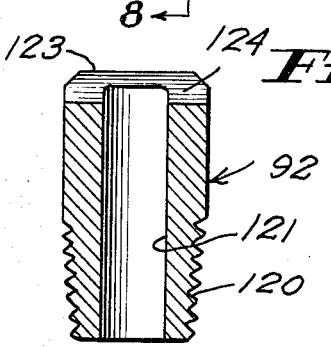

Nov. 15, 1966   H. SCHMIDT ET AL   3,285,417
FILTER SLUICING METHOD AND APPARATUS
Filed Jan. 16, 1964   4 Sheets-Sheet 4
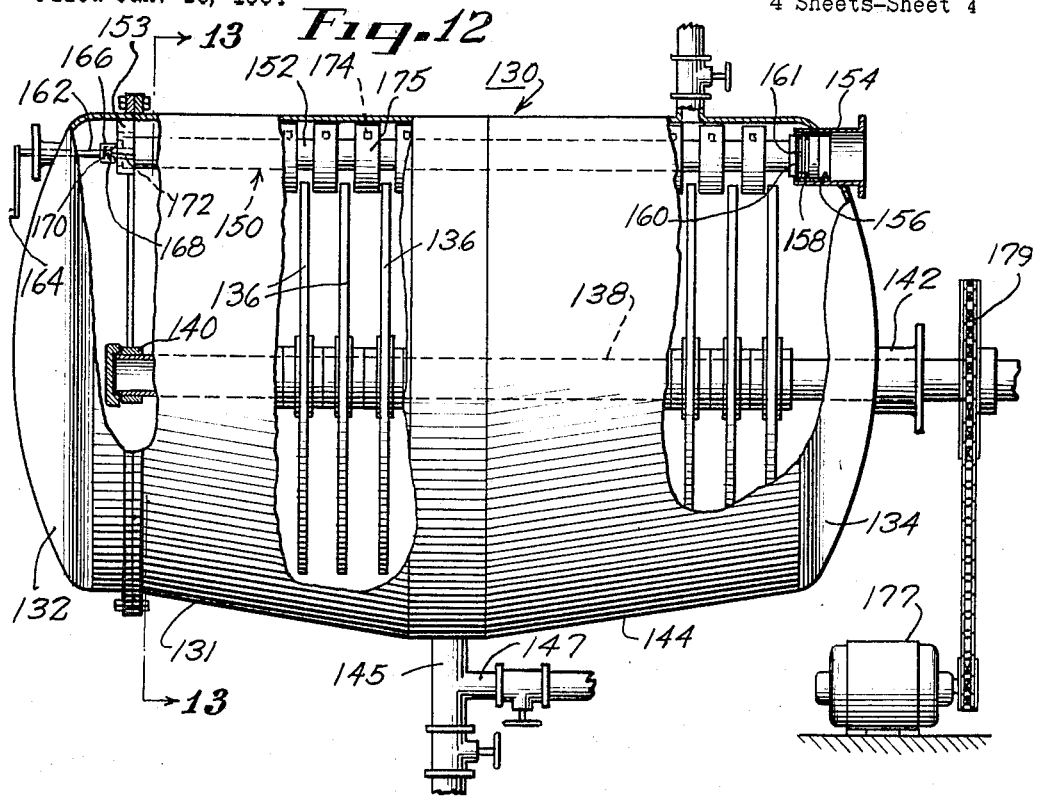
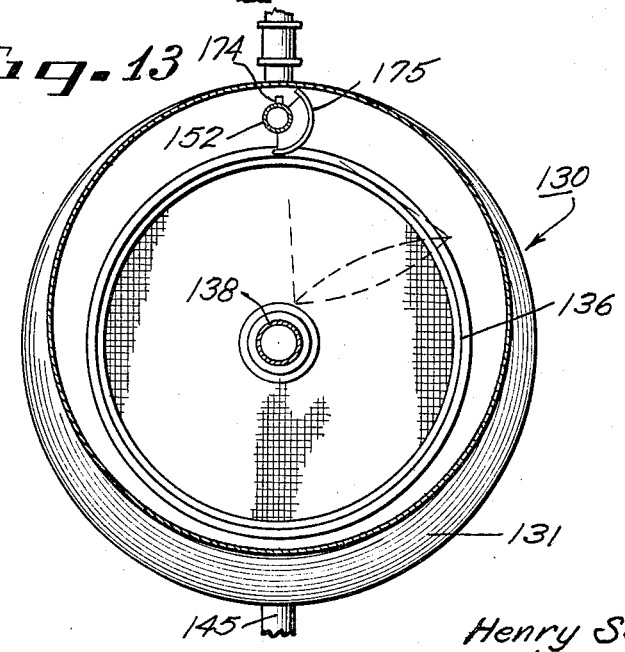
INVENTORS
Henry Schmidt, Jr.
BY James F. Zievers
Fidler, Bradley, Patnaude & Fetherbridge
ATTORNEYS

United States Patent Office 3,285,417
Patented Nov. 15, 1966

3,285,417
FILTER SLUICING METHOD AND APPARATUS
Henry Schmidt, Jr., Hinsdale, and James F. Zievers, La
Grange, Ill., assignors to Industrial Filter & Pump Mfg.
Co., Cicero, Ill., a corporation of Illinois
Filed Jan. 16, 1964, Ser. No. 338,181
10 Claims. (Cl. 210—81)

The present invention relates to filters which clarify a liquid as it passes through a porous filter medium across the pores of which solids suspended in the liquid are trapped and thereby removed from the liquid. The invention more particularly relates to a new and improved method and apparatus for cleaning the filter medium by directing high velocity jets or sprays of a sluicing liquid against the filter medium.

The present invention is described hereinafter in connection with the horizontal pressure leaf type of filter, but it will be understood by those skilled in the art that several features of this invention are applicable to other types of filters such, for example, as the vertical type.

In the operation of filters, periodic cleaning and general maintenance of the filter elements are necessary. In one type of pressure filter, the liquid to be clarified flows into a plurality of hollow perforate filter leaves and the entrained solids in the liquid accumulate on the outer surfaces of the filter leaves to form porous filter cakes which eventually build up to the point where they impair the operational efficiency of the filter. At this time, the cakes must be removed. One method of removing the filter cakes from the filter leaves is to direct high velocity jets or sprays of a cleaning fluid, such as pure water onto the filter cakes accumulated on the filter leaves. This method effectively washes the cake off the leaves, and is known in the art as "sluicing." A filter employing this type of filter cake removal apparatus and method is disclosed in Application Serial No. 135,016 filed August 30, 1961 now Patent No. 3,240,339, by Henry Schmidt, Jr. and Earl A. Borre and assigned to the same assignee as the present invention.

In order to provide sluicing apparatus which provides satisfactory cleaning of the filter leaves while minimizing the amount of sluicing liquid which is used, it has been found necessary to provide a precisely controlled sluice liquid spray or jet pattern. This can best be accomplished by the use of nozzles which have a relatively small aperture or orifice through which the sluicing liquid is forced under high pressure. Although it has previously been recognized that nozzles having small apertures provide the most desirable sluicing pattern, such nozzles have not found widespread use for the reason that, with prior art types of sluicing apparatus, the nozzles would become clogged during the pre-coat and filtering operations. Hence, when the sluicing operation was commenced, many of the nozzles were found to be plugged, and unsatisfactory cleaning of the filter leaves resulted. Moreover, since the nozzles were, for this reason, found to be ineffective for directing the sluicing liquid onto the filter leaves, other less efficient means for sluicing the leaves had to be employed. These other sluicing devices necessitated the use of additional auxiliary equipment in order to compensate for the less efficient sluicing pattern directed against the leaves. While some of these other arrangements such as those disclosed in the above identified application operate satisfactorily, such filters cost substantially more to manufacture than filters embodying the features of the present invention which enable the use of precisely designed nozzles for directing the sluicing liquid onto the filter leaves.

Therefore, a principal object of the present invention is to provide new and improved methods and means for sluicing a filter medium to remove a filter cake therefrom.

Another object of the present invention is to provide a new and improved sluicing mechanism employing nozzles for directing a precisely controlled spray or jet of sluicing liquid onto a filter medium.

A futher object of the present invention is to provide a multiple leaf type filtration unit having a new and improved sluicing mechanism incorporated therein.

Another object of the present invention is to provide a new and improved multiple leaf filter.

Still another object of the present invention is to provide a new and improved oscillatory sluicing assembly for use with a horizontal type multiple pressure leaf filter.

A still further object of the present invention is to provide a new and improved sluicing assembly for use in connection with a multiple leaf type filter wherein the filter leaves are rotated relative to the sluice assembly to cause the spray pattern to cover the entire surface of the filter leaves.

A still further object of the present invention is to provide a new and improved nozzle for directing a sluicing liquid onto a filter medium.

Another object of the present invention is to provide a new and improved nozzle assembly for precisely controlling a spray of sluicing liquid directly against a filter medium.

Briefly, the above and further objects are realized in accordance with the present invention by providing a sluicing header having a plurality of small sluicing apertures or orifices aligned along one side of the header and mounting the header in a movable manner such that the apertures are all located substantially at the top of the header when the supply of sluicing liquid to the header is terminated. In this manner, upon completion of the sluicing operation the header remains filled with the clean sluicing liquid whereby during the ensuing pre-coat and filter cycles the influent or pre-filt cannot flow into the header to clog or plug the orifices therein. As those skilled in the art are aware, it is conventional to pass what is termed a "pre-filt" liquid, such as a suspension of diatomaceous earth, through the filter in order to coat (or pre-coat) the cleaned filter leaves with material that reduces the interstitial spacing of the filter cloth or screen on the leaves to the desired size to trap the solids contained in the "influent," which is the liquid furnished during the filter cycle. The cycle of operation during which the pre-filt liquid is used is termed a "pre-filt" or "pre-coat" cycle; and the cycle of operation during which the influent is used is termed a filter cycle. It is during both the pre-filt and filter cycles that solids tend to flow into sluicing headers through the spray orifices, thus clogging them and preventing proper operation during a subsequent sluicing operation. The present invention solves this problem, in both the oscillatory and rotary types of sluicing assemblies, because the invention provides for moving the sluicing headers into a predetermined position near the end of the sluicing cycle so that the orifices in the headers are disposed along the topmost part of the header.

Further objects and advantages and a better understanding of the present invention may be had by reference to the following detailed description taken in connection with accompanying drawings wherein:

FIG. 1 is side elevation of a filter including an oscillatory sluicing assembly embodying the present invention, certain portions of the filter tank being broken away to show the internal elements of the filter;

FIG. 2 is an enlarged fragmentary view, partially in section showing the way in which the sluice headers are mounted and supplied with sluicing liquid;

FIG. 3 is a vertical, sectional view taken along the line 3—3 of FIG. 1;

FIG. 4 is a fragmentary view taken along the line 4—4 of FIG. 3 assuming the entire device to be shown therein;

FIG. 5 is a sectional view illustrating one arrangement for mounting sluicing nozzles on the sluice header and for guiding the sluice header relative to the associated filter leaves;

FIG. 6 is a view similar to FIG. 5 showing another arrangement for directing a spray of sluicing liquid onto the filter leaves in accordance with the teachings of the present invention;

FIG. 7 is a fragmentary view showing an alternative arrangement for guiding the sluice header relative to the filter leaves where the filter leaves are relatively sturdy as in the case, for example, where the outer surface thereof is metal;

FIG. 8 is a vertical sectional view taken along line 8—8 of FIG. 7;

FIG. 9 is an end of view of a nozzle which is particularly adapted for directing a spray of sluicing liquid onto a filter medium;

FIG. 10 is a side elevational view of the device of FIG. 9;

FIG. 11 is a sectional view taken along the line 10—10 of FIG. 9;

FIG. 12 is a side elevational view of a filter including rotatable, an axially disposed horizontal sluice header operatively associated with a plurality of rotatable filter leaves; and FIG. 13 is a vertical sectional view taken along the line 13—13 of FIG. 12.

Referring now to the drawings and more particularly to FIG. 1 thereof, there is shown a horizontal type multiple pressure leaf filter, generally indicated by the numeral 20, which includes a horizontally extending tank 21 supported on a plurality of uprights 22 on the floor 23 of the room in which the filter unit 20 is employed. The filter tank 21 is permanently closed at one end by a cover 24 fixed thereto and a removable end cover 25 is secured to the opposite end of the tank by means of a plurality of spaced apart and cooperably mounted clamps 26.

The filter unit 20 is a pressure filter of the multiple leaf type employing a plurality of vertically disposed, circular filter leaves 28. As best shown in FIG. 3, each of the filter leaves 28 is rigidly connected, as by means of respective bolts 30, at the upper end thereof, to a horizontally extending impactor and guide bar 29. The bar 29 is connected at its end adjacent the removable end cover 25 to a rod 31 extending from a conventional reciprocatory impacting device 33. The filter leaves 28 may thus be vibrated in order to remove the filter cake therefrom. This type of cleaning is particularly effective when used in a dry cake removable operation.

As appears in FIG. 3 each of the filter leaves 28 includes a pair of screens 28a and 28b, maintained in spaced relation by a suitable, facially grooved core (not shown), and an annular rim 28c which encompasses the spaced screens 28a and 28b. The influent, the liquid to be clarified, flows under pressure from the filter chamber into the cavities in the leaves between the screens 28a and 28b and thence into an outlet manifold 36 via respective ones of a plurality of outlet couplings 28d which are tightly fitted into suitable apertures in an elongated flat bar member 35 forming a top closure plate of the outlet manifold 36. The manifold 36 thus supports both the leaves 28 and the impactor bar 29 which is secured to the leaves 28 across tops thereof. The outlet coupling 28d from each filter leaf 28 includes an annular groove 37 which receives a resilient O-ring 37a to provide a leak proof connection between each leaf 28 and the manifold 36.

In order to remove the filter leaves as an assembled unit from tank 21, one end of the outlet manifold 36 carries an extension 36a which serves as the mounting for an axle 38 of a freely rotatable wheel 39 which rides on the bottom 40 of the filter tank 21. The extension 36a of the outlet manifold 36 supports a post 41 carrying a saddle bearing 42 for rotatably supporting a conduit 44 which supplies sluicing liquid to a sluicing assembly indicated generally by the numeral 45. The outlet manifold 36 is connected at its outer end adjacent the removable end cover 25 to an outlet conduit 46 which is mounted in the removable end cover 25 for discharge of the clarified liquid from the tank 21.

In order to facilitate removal of the filter leaves 28 and the sluicing assembly 45 from the tank 21, the cover 25 carries a fixed bracket 47 on which is pivotally mounted a trolley 48 having trolley wheels 49 and 50 which ride on a track 51 of a horizontally extending beam 52 supported, as indicated at 53, on the tank 21 and, as indicated at 54, on an upright 55 supported by the floor 23. The bracket 47 is connected to an endless belt or chain 56 supported between a freely rotatable idler gear 57 and a drive gear 58, each of which gears is mounted for rotation on the beam 52. The drive gear 58 is secured to and mounted for rotation with a gear (not shown) which is driven by a belt or chain 60 which in turn is driven by a gear 61 connected to a suitable motor (not shown). If desired the gear 61 may be driven by a hand crank or the like.

With the above described construction, in order to remove the filter leaves 28 and the sluicing assembly 45 from the tank for purposes of repair and inspection, or for removing the cake from the leaves 28 in a dry cake removal operation using the impactor 33, the clamps 26 are first loosened and released and the drive gear 61 is rotated either manually or by means of a motor thereby to move the trolley 48 to the right (as shown in FIG. 1). This moves the cover 25 and the filter leaves 28 and the sluicing assembly 45, which are fastened thereto, out of and away from the tank 21.

Liquid to be clarified is introduced into the filter tank 21 near the bottom thereof through a valved inlet conduit 63 and is filtered as it passes through a porous pre-coat layer distributed over the surfaces of the filter leaves 28 in a manner well known in the art. The clarified liquid passes from the cavities in the filter leaves 28 to the outlet manifold 36 from which it is discharged through the outlet conduit 46. A valved drain outlet 64 also opens into the bottom of the tank 21 and enables the periodic removal of sediment from the bottom of the filter chamber.

*Sluicing Assembly*

As shown in FIG. 1, the sluicing assembly 45 is connected through the conduit 44 to a stationary inlet supported by a bracket at the center of the cover 24. Sluicing fluid, such, for example, as water, is supplied under pressure through a solenoid control valve 66 to the pipe 65. As more fully described hereinafter the valve 66 is opened at the beginning of a sluicing cycle and is closed at the termination of a sluicing cycle. The inlet pipe 65 supplies the sluicing fluid to the sluicing assembly 45 through the distributor conduit 44 which is connected thereto for relative operation in a manner best shown in FIG. 2. More particularly, the conduit 44 slidably extends into a bushing 68 which is tightly fitted into the inner end of the pipe 65. The conduit 44 is provided with an annular groove 69 receiving an O-ring type resilient sealing gasket 70 and is further provided with an annular groove 71 which is connected to the interior of the conduit 44 by way of an aperture 72 whereby the bearing is lubricated by the sluicing liquid. A small hole 73 is provided at the top of the pipe 65 to permit the sluicing fluid to flow over the upper side of the pipe 65 interiorly of the tank 21 to flush off any sediment which may be collected thereon.

The distributor conduit 44 connects to a valve assembly 75 which carries the sluicing fluid to a pair of sluice headers 76 and 77 while the assembly 45 is being oscillated. Preferably, the valve assembly 75 is identical to the valve assembly 160 described in the heretofore referenced application Serial No. 135,016, now Patent No. 3,240,338. The sluicing headers 76 and 77 include radially extending portions 76a and 77a which respectively connect to horizontally extending header portions 76b and 77b respectively. Adjacent to the removable end cover 25 the header portions 76b and 77b are closed and are connected together by a bar 79 which holds the portions 76b and 77b, in mutually parallel relationship.

For the purpose of oscillating the sluicing assembly 45 during a sluicing operation, an oscillatory drive unit 80 is mounted on the cover 25 externally thereof and is connected to the bar 79 by means of a drive shaft 82 which is journaled for oscillation about the central longitudinal axis of the cover 25. The oscillatory actuator unit 80 may be identical to the oscillatory actuator unit 77 described in detail in the hereinbefore referred to application Serial No. 135,016. The unit 80 functions to oscillate the sluicing assembly 45 through an angle of somewhat less than 180°. As best shown in FIG. 3, each of the header portions 76b and 77b oscillates between a position adjacent the impactor bar 29 and a position adjacent the outlet manifold 36.

In order to direct a high velocity jet or spray of a sluicing fluid onto both faces of each of the filter leaves 28, the sluice header portions 76b and 77b are each provided with a plurality of nozzle assemblies 85 which are secured to the header portions 76b and 77b over respective ones of a plurality of spaced apertures 86. The apertures 86 are aligned along the uppermost surface of the header portions 76b and 77b when the header portions 76b and 77b are located in substantially the same horizontal plane as shown in full lines in FIG. 3. In accordance with certain features of the present invention different nozzle constructions are taught and these different nozzles produce different spray patterns which are most effective in removing different types of filtered cakes as are encountered under different operating conditions.

Referring to FIG. 5, there is shown a nozzle assembly 85 which comprises an elbow 88, suitably secured as by welding to the header portion 76b over an aperture 86, and which includes a threaded, female pipe fitting portion 90 in which a nozzle 92 is sealingly threaded. Sluicing liquid is thus supplied to the nozzle assembly 85 from the header 76 and is directed in a controlled pattern onto the faces of the adjacent filter leaves between which the nozzle assembly 85 is located. When the sluicing assembly 45 is in the position indicated by solid lines in FIG. 3 wherein the header portions 76b and 77b are in the same horizontal plane, the nozzles 85 are all located on the top side of the headers so that when the solenoid valve 66 is closed to terminate the sluicing operation, the sluicing assembly 45 and more particularly the headers 76 and 77 remain completely filled with sluicing fluid. In prior art constructions, the sluicing headers were either completely or partially drained of sluicing liquid at this time, so that during the succeeding pre-filt operation when the pre-coat material was introduced into the filter chamber, the headers would fill up with the pre-filt liquid and suspended solids. Inasmuch as the pre-filt liquid by necessity includes a high percentage of entrained solids, such, for example, as particles of diatomaceous earth, asbestos or other fiberous materials, when this liquid later drained out of the headers through the apertures it would plug them. These apertures are necessarily very small in order to effect a high velocity spray without using an excessive quantity of sluicing liquid at an excessive pressure thereby further complicating the problem. Hence, at the beginning of the succeeding sluice operation, the pre-coat particles which became lodged in the sluice apertures or in the nozzles if such were used commonly resulted in plugging of several or all of the sluice apertures whereby a very poor, inefficient cleaning of the filter leaves resulted. However, by maintaining the sluicing assembly filled with the sluicing liquid during the entire filtering operation it has been found that the problem of clogged sluicing nozzles has been completely eliminated.

The nozzle assemblies 85 are disposed between adjacent ones of the filter leaves 28 and as best shown in FIG. 4 a pair of nozzles are provided for the space between each pair of filter leaves 28, one nozzle being mounted on the header portion 76b and the other being mounted on the portion 77b. Although only one nozzle need be provided for some applications, it has been found that a more uniform and effective spray pattern over the entire surface of a relatively large leaf is best provided by the use of the two nozzles operating from approximately diametrically opposite sides of the filter leaves 28. As best shown in FIG. 3, the nozzles in each pair are oriented so as to provide bypassing spray patterns which do not interfere with one another.

In order to hold the leaves in spaced apart relationship at the peripheral portions thereof during the sluice operation, a plurality of leaf supporting roller assemblies 94 are mounted for free rotation on the sluice header portions 76b and 77b. The roller assemblies 94 preferably include a roller 97 formed of a suitable material such as, nylon, which is provided with a central bore 98 counterbored as the respective ends thereof, as indicated at 99 and 100. An axle 95, mounted on the sluice header is rotatably received in the bore 98. A pair of flexible, diaphragm type seals 102 are mounted in each of counterbores 99 and 100 and held in place by a pair of washers 104 and 105. A resilient snap ring 107 is received in an annular groove at the end of the axle 95 to hold the assembled roller 97 in place. A blind, axial hole 109 is drilled into the axle 95 from the inner end thereof and the hole 109 communicates with the outer surface of the axle 95 by means of a right angle hole 111 which supplies the sluicing liquid to the bearing surfaces between the roller 97 and the axle 95 to provide lubrication therefor. The seals 102 provide check valves which permit the flow of liquid under pressure from the space between the axle 95 and the roller 97. The seals are sufficiently stiff to prevent the sluicing liquid to leak out of the header when the valve 66 is closed.

The roller assembly 94 is preferably used when the filter leaves 28 are covered with a relatively fragile material such, for example, as cloth fabric. Where, however, the leaves 28 have a relatively durable metal outer surface, the roller assembly 94 may be replaced by a simple U-shaped member 114 best shown in FIGS. 7 and 8. As there shown, the member 114 is circular in cross-section and is suitably secured, as by welding, to the header.

Referring now to FIG. 6, there is shown an arrangement for directing a spray of sluicing liquid onto the peripheral surfaces of the filter leaves 28. In this embodiment of the invention the horizontally extending sluice header portion 115 is provided with a plurality of orifices 116 located in proximity to the upper side thereof when the header portion 115 is at the rest portion at the end of a sluicing operation. In FIG. 6, the header 115 is shown in the position it occupies in the pre-filt and filter cycles. In order to deflect the sluicing fluid onto the filter leaves as it flows out of each orifice 116 there is provided an angled plate 118 which is suitably secured to the header portion 115 by means of a threaded bolt 119. While the cost of this assembly illustrated in FIG. 6 is substantially less than that of the nozzle arrangement hereinbefore described, it is substantially less efficient in that more sluicing fluid is required in order to clean the filter leaves. Moreover, where the filter cake is particularly gummy and tenaciously clings to the surfaces of the filter leaves this deflector arrangement is much less satisfactory than the more precisely controlled nozzle structure.

Referring now to FIGS. 9, 10 and 11 there is shown, in detail, the construction of the spray nozzle 92. The nozzle 92 has an external pipe thread 120 at the bottom end thereof and a central, cylindrical bore 121 opens at the bottom end. The bore 121 terminates near the upper end 123 of the unit. A transversely extending V-shaped groove 124 having an internal angle of about forty-five degrees has the apex line thereof opening a substantial distance into the bore 121 and is provided at the upper end of the nozzle. The groove 124 extends along a diameter of the bore 121 and the length of the groove 124 is approximately twice the diameter of the bore 121.

Moreover, as best shown in the drawings, the bore 121 terminates approximately midway between the apex and the base of the V-shaped groove 124. This nozzle construction provides a uniform spray pattern throughout a rectangular area defined by angles of approximately 120° and 15°. Accordingly, the nozzles 92 should be positioned such that the grooves 124 extend in a direction parallel to the header portions 76b and 77b. FIGS. 7 and 8 show the spray pattern obtainable with the nozzle 92.

*Sluicing Assembly for Rotating Leaf Type Filter*

Referring now to FIG. 12 there is shown a filter assembly 130 comprising a main tank 131 which is suitably mounted by means not shown and which includes a fixed end member 134 which is permanently secured to the right-hand end thereof and a removable cover 132 which is removably and sealingly secured by a suitable means to the left end of the tank 131 to permit removal of the internal parts of the filter. A plurality of hollow filter leaves 136, having a circular geometry, are mounted at spaced apart locations on an axially disposed outlet conduit 138 which is journaled at one end in a bearing 140 suitably mounted in the tank 131 and which is journaled at its opposite end and by suitable means 142 connected to the fixed end member 134. The means 142 includes the necessary sealing structure so that the tank 131 may be pressurized without leaking during operation thereof. The bottom 144 of the tank 131 tapers downwardly and at the lowest point thereof is provided with a depending conduit 145 which as indicated by the drawing connects to a drain outlet. An inlet 147 connects at right angles to the conduit 145 and is used for respectively supplying the pre-filt and the influent to the filter during the pre-filt and filter cycles.

A sluicing assembly 150 is mounted in the tank 131 directly above the filter leaves 136 and extends in a direction parallel to the outlet manifold 138. The sluicing assembly 150 more particularly includes a pipe or header 152 which is closed off at its left-hand end and which is journaled for rotation in a bearing 153 mounted in the tank 131. The other and right-hand end of the pipe 152 is rotatably and sealingly received in a conduit 154 which is suitably secured as by welding in the fixed end member 134. A bearing sleeve 156 is secured in the conduit 154 and receives the right-hand end of the header tube 152 which is annularly grooved to receive a sealing ring 158. A second annular groove 160, which is connected to the cavity in the header 152 by a hole 161, is provided for lubricating the bearing surfaces during the sluicing operation.

In order to rotate the sluicing assembly 150 there is provided an axial drive shaft 162 which extends through the removable end cover 132 and is suitably sealed and rotatably mounted thereto by means well known in the art. A handle 164 is attached to the shaft 162 externally of the filter tank to permit manual rotation of the sluice assembly 150. It will be understood, however, that in an automatic type of operation a motor and suitable control circuits therefor may replace the handle 164 without departing from the present invention. A coupling member 166 is mounted at the inner end of the shaft 162 and includes an axial slot 168 for receiving a pin 170 which extends in a transverse direction from a shaft 172 which extends axially from the header tube 152. Mounted along the top of the header tube 152 are a plurality of nozzles 174 such, for example, as the type 92 shown and described in FIGS. 9, 10 and 11 hereof. Other types of nozzles may be used depending upon the type of sluice pattern which is desired. A plurality of generally arcuate guide plates 175 as best shown in FIG. 13 are mounted adjacent to the nozzles 174 to hold the peripheral edges of the filter leaves 136 in place during the sluicing operation.

The sluicing assembly 150 is shown in FIGS. 12 and 13 in the pre-filt or filtering cycle position. When, however, a sufficiently thick layer of filter cake has been deposited on the filter leaves where operational efficiency becomes impaired, the supply of influent to the tank is terminated and the tank is drained. Thereafter, the assembly 150 is rotated to move the nozzles 174 to a position adjacent to the top surfaces of the leaves 136. Sluicing liquid is then supplied under pressure to the inlet conduit 154 and a high velocity spray or other desired pattern of sluicing liquid is directed onto the faces of the filter leaves, thereby to wash off the filter cakes deposited thereon. Simultaneously with the spray of sluicing liquid onto the leaves, the manifold 138 is rotated by means of a suitable motor operated drive mechanism 177 which is connected to a sprocket 179 fixedly mounted on the manifold 138. As the leaves 136 are thus rotated the entire facial surfaces thereof pass the stationary nozzles 174 and are washed clean of filter cake. At the end of the sluicing operation, while the sluicing fluid is still being supplied to the header tube 152, although the pressure may be reduced at this time, the assembly is rotated into the position illustrated in FIGS. 12 and 13 wherein the nozzles 174 are located at the top and above the header tube 152. The supply of sluicing fluid is now terminated and inasmuch as the nozzles 174 are located above the header tube 152 the entire header remains filled with the clean sluicing liquid.

In its broadest aspects, the present invention teaches a method and means of sluicing wherein the sluice header is maintained filled with a clean sluice liquid during the pre-filt operation and during the filtering operation thereby to prevent the flow of solid particles into the sluice header.

While the present invention has been described in connection with particular embodiments thereof it will be understood that many changes and modifications of this invention may be made by those skilled in the art without departing from the true spirit and the scope thereof. Accordingly, the appended claims are intended to cover all such changes and modifications as fall within the true spirit and scope of the present invention.

I claim:

1. Filtration apparatus including a tank defining an axially extending horizontal filter chamber, a plurality of transverse filter elements disposed along the axis of said chamber, means to completely fill and maintain said chamber during a filter cycle with influent containing solids to be filtered out by said elements; sluicing means comprising:
   (a) at least one tubular sluice header rotatably mounted on said tank in a horizontal position in said chamber and extending adjacent to said filter elements,
   (b) a plurality of spray aperture means spaced along one side of said header;
   (c) said tubular header and spray aperture means arranged in said chamber to be completely covered by said influent during said filter cycle;
   (d) means for selectively controlling and terminating the supply of sluicing fluid to sand header;
   (e) means for effecting relative motion between said header and said filter elements when sluicing fluid is supplied to said header during a sluicing cycle whereby said fluid is sprayed through said aperture means against said elements to remove filtered solids therefrom; and (f) means for effecting rotation of said header until the side thereof along which said spray aperture means are spaced is positioned upwardly before said means for selectively controlling the supply of sluicing fluid terminates said supply to keep said completely covered header filled with sluicing fluid to prevent solids contained in the influent from clogging the spray aperture means in said header during a filter cycle.

2. The combination set forth in claim 1 comprising means rotatably mounting said filter elements in said tank, and means mounting said header above said elements.

3. Filtration apparatus as set forth in claim 1 wherein said means for effecting relative motion between said header and said filter elements comprises drive means for rotating said leaves.

4. Filtration apparatus as set forth in claim 1 wherein said means for effecting relative motion between said header and said filter elements comprises drive means for oscillating said header.

5. In a filter, the combination of a filter leaf assembly comprising an outlet manifold and a plurality of circular filter leaves mounted thereon, a sluicing assembly comprising a pair of tubular headers extending parallel to said manifold on opposite sides of said leaves, means for oscillating said headers about said leaves, said headers each having a plurality of aligned apertures therein, all of said apertures being disposed at the top of the associated headers when said header assembly is in a predetermined position, means for supplying sluicing liquid to said headers, and means for moving said header assembly into said predetermined position prior to interrupting the supply of sluicing liquid to said headers.

6. The combination of claim 5 comprising a plurality of elbows mounted over said apertures, and a plurality of nozzles extending from said elbows and pointing toward said leaves.

7. A method of operating a filter of the type including a filter element located in a filter chamber and an apertured sluice header located in said chamber for directing a sluicing liquid onto the filter element, comprising
filling said sluice header with a sluicing liquid prior to a succeeding operating cycle of the filter,
and maintaining said sluice header filled with said sluicing liquid during said succeeding operating cycle to prevent the flow of liquid through said apertures into said sluice header during the succeeding operating cycle.

8. A method according to claim 7 wherein said succeeding operating cycle is a pre-filt operation wherein a liquid having a high percentage of pre-coat solids suspended therein is supplied under pressure to said chamber.

9. A filter comprising
a tank,
a plurality of circular filter leaves mounted in said tank,
a sluicing assembly including a pair of tubular headers mounted in mutually parallel relationship and extending along opposite sides of said leaves,
said headers each having a plurality of spaced apertures therein,
a plurality of nozzles respectively mounted over said apertures, said nozzles being arranged so that the nozzles on one header are directed generally toward the nozzles on the other header and so that all of the nozzles are directed toward said leaves and are disposed between adjacent ones of said leaves, and
means mounting said headers for oscillation about the peripheries of said leaves, said oscillation including an angular position at which the nozzles on each header are at the top of each said header, wherein each of said nozzles has a spray pattern of about one-hundred twenty degrees and two nozzles are positioned between each pair of adjacent leaves, said nozzles being directed such that the respective spray patterns are in overlapping relationship.

10. A filter comprising
a tank,
a plurality of circular filter leaves mounted in said tank,
a sluicing assembly including a pair of tubular headers mounted in mutually parallel relationship and extending along opposite sides of said leaves,
said headers each having a plurality of spaced apertures therein,
a plurality of nozzles respectively mounted over said apertures, said nozzles being arranged so that the nozzles on one header are directed generally toward the nozzles on the other header and so that all of the nozzles are directed toward said leaves and are disposed between adjacent ones of said leaves, and
means mounting said headers for oscillation about the peripheries of said leaves, said oscillation including an angular position at which the nozzles on each header are at the top of each said header, wherein the axis of said leaves is horizontal and said pair of tubular headers extends axially in a horizontal direction, and the nozzles on each header are on the top of each said header when said headers are diametrically opposite each other and in a horizontal plane.

References Cited by the Examiner
UNITED STATES PATENTS

| 2,609,101 | 9/1952 | Howland et al. | 210—334 |
| 2,731,157 | 1/1956 | Purmort | 210—391 X |
| 2,868,379 | 1/1959 | Hunziker | 210—391 X |
| 3,181,798 | 5/1965 | Wanlin et al. | 239—601 X |
| 3,240,338 | 3/1966 | Schmidt et al. | 210—141 |

FOREIGN PATENTS

| 38,730 | 5/1956 | Poland. |
| 38,731 | 5/1956 | Poland. |

REUBEN FRIEDMAN, *Primary Examiner.*

D. M. RIESS, *Assistant Examiner.*